(12) United States Patent
Meir et al.

(10) Patent No.: US 8,990,475 B2
(45) Date of Patent: Mar. 24, 2015

(54) NAND FLASH MEMORY SYSTEM ARCHITECTURE (75) Inventors: Avraham Meir, Rishon Lezion (IL); Amir Mosek, Tel Aviv (IL); Amir Lehr, Hod Hasharon (IL); Menahem Lasser, Kohav Yair (IL)

(73) Assignee: Sandisk IL Ltd., Kfar Saba (IL)

( * ) Notice: Subject to any disclaimer, the term of this patent is extended or adjusted under 35 U.S.C. 154(b) by 0 days.

(21) Appl. No.: 11/350,946

(22) Filed: Feb. 10, 2006

(65) Prior Publication Data
US 2006/0184724 A1    Aug. 17, 2006

Related U.S. Application Data

(60) Provisional application No. 60/651,762, filed on Feb. 11, 2005, provisional application No. 60/758,599, filed on Jan. 13, 2006.

(51) Int. Cl.
G06F 12/00 (2006.01)
G06F 12/02 (2006.01)
G06F 3/06 (2006.01)
G06F 9/44 (2006.01)
G06F 9/445 (2006.01)
G06F 12/10 (2006.01)

(52) U.S. Cl.
CPC .......... *G06F 12/0292* (2013.01); *G06F 3/0611* (2013.01); *G06F 3/0632* (2013.01); *G06F 3/0679* (2013.01); *G06F 9/4403* (2013.01); *G06F 9/4406* (2013.01); *G06F 9/44573* (2013.01); *G06F 12/10* (2013.01); *G06F 12/0246* (2013.01); *G06F 2212/2022* (2013.01); *G06F 2212/7201* (2013.01); *G06F 2212/7203* (2013.01)
USPC ................ 711/103; 711/104; 711/203; 711/6

(58) Field of Classification Search
USPC ........................................ 711/103, 104, 203, 6
See application file for complete search history.

(56) References Cited

U.S. PATENT DOCUMENTS

| | | | |
|---|---|---|---|
| 5,404,485 A | 4/1995 | Ban | |
| 5,937,425 A | 8/1999 | Ban | |
| 6,148,354 A | 11/2000 | Ban et al. | |
| 6,591,330 B2 | 7/2003 | Lasser | |

(Continued)

FOREIGN PATENT DOCUMENTS

| | | |
|---|---|---|
| JP | 2004220557 A | 5/2004 |
| WO | 2004049168 A1 | 6/2004 |

(Continued)

OTHER PUBLICATIONS

John L. Hennessy and David A. Patterson, Computer Organization and Design, 1998, Morgan Kaufmann Publishers Inc., second edition, p. 541.*

(Continued)

*Primary Examiner* — Mardochee Chery
(74) *Attorney, Agent, or Firm* — Toler Law Group, PC (57) ABSTRACT

A data storage device includes a NAND flash memory, an executable interface and a controller for receiving, from a host, via the executable interface, an instruction to access the NAND flash memory at a virtual address and for translating the virtual address to a physical address of the volatile memory. Preferably, the controller also provides boot functionality to the host.

19 Claims, 4 Drawing Sheets

(56) References Cited

U.S. PATENT DOCUMENTS

| | | | |
|---|---|---|---|
| 6,725,321 B1* | 4/2004 | Sinclair et al. | 711/103 |
| 7,254,690 B2* | 8/2007 | Rao | 711/169 |
| 7,296,143 B2* | 11/2007 | Gaskins et al. | 713/2 |
| 7,302,517 B2* | 11/2007 | Lim et al. | 711/103 |
| 7,533,214 B2* | 5/2009 | Aasheim et al. | 711/103 |
| 7,613,880 B2 | 11/2009 | Miura et al. | |
| 2001/0015905 A1* | 8/2001 | Kim et al. | 365/51 |
| 2003/0163631 A1* | 8/2003 | Aasheim et al. | 711/103 |
| 2003/0206442 A1* | 11/2003 | Tang et al. | 365/185.17 |
| 2004/0015771 A1* | 1/2004 | Lasser et al. | 714/763 |
| 2004/0059906 A1* | 3/2004 | Park et al. | 713/2 |
| 2004/0107327 A1* | 6/2004 | Takahashi et al. | 711/170 |
| 2004/0117609 A1* | 6/2004 | Stalker et al. | 713/2 |
| 2004/0186985 A1 | 9/2004 | Tran et al. | |
| 2005/0027928 A1* | 2/2005 | Avraham et al. | 711/103 |
| 2006/0010285 A1* | 1/2006 | Georgis | 711/111 |
| 2006/0041711 A1 | 2/2006 | Miura et al. | |

FOREIGN PATENT DOCUMENTS

| | | |
|---|---|---|
| WO | 2004049168 A1 | 10/2004 |
| WO | 2006085324 A2 | 8/2006 |

OTHER PUBLICATIONS

Microsoft Computer Dictionary, 2002, Microsoft Press, 5th edition, pp. 155, 177.*

Samsung Electronics, 1Gb 1.8V NAND Flash Errata [online], Mar. 2003,Samsung Electronics Co. [retreived on Oct. 4, 2007] retreived from the Internet <URL: http://www.tranzistoare.ro/datasheets/1150/264898_DS.pdf>, pp. 1-37.*

Tanenbaum, Andrew S., Modern Operating Systems, 2001, Prentice-Hall, 2nd edition, pp. 289-292.*

The Authoritative Dictionary of IEEE Standards Terms, Dec. 2000, Standards Information Network IEEE Press, 7th edition, p. 882.*

Fujitsu Introduces Industry's First Stacked MCP with NAND Flash Memory and FCRAM, Mar. 7, 2001, Fujitsu, retreived from internet on Feb. 5, 2008, <url: http://www.fujitsu.com/us/news/pr/fma_20010307.html>, pp. 1-2.*

NOR flash memory [online], whatis.techtarget.com, Jul. 28, 2008 [retreived on Nov. 9, 2010] Retreived from the Internet <URL: http://whatis.techtarget.com/definition/nor-flash-memory.html>.*

U.S. Appl. No. 11/102,814, filed Mar. 2005, Slobodan Brcin et al.

International Search Report and Written Opinion, International Application No. PCT/IL2006/00176, dated Jan. 25, 2007, 9 pages.

Reissue U.S. Appl. No. 10/292,868, entitled "Architecture for a Universal Serial Bus-Based PC Flash Disk," filed Nov. 13, 2002.

Reissue U.S. Appl. No. 10/293,986, entitled "Architecture for a Universal Serial Bus-Based PC Flash Disk," filed Nov. 14, 2002.

Decision of Rejection mailed Jun. 21, 2012 issued in Chinese Application No. 200680004654.5 with English translation, 13 pages.

Office Action mailed Feb. 24, 2012 issued in Chinese Application No. 200680004654.5 with English translation, 9 pages.

Final Office Action for U.S. Appl. No. 11/923,681 mailed Aug. 5, 2009, 15 pp.

Non-Final Office Action for U.S. Appl. No. 11/923,681 mailed Jan. 20, 2010, 21 pp.

Final Office Action for U.S. Appl. No. 11/923,681 mailed Jun. 22, 2010, 29 pp.

Non-Final Office Action for U.S. Appl. No. 11/923,681 mailed Nov. 29, 2010, 12 pp.

Office Action dated Jan. 21, 2011, issued in Japanese Patent Application No. 2007-554739, with English translation, 5 pp.

Final Office Action for U.S. Appl. No. 11/923,681 mailed Apr. 4, 2011, 36 pp.

Office Action dated May 13, 2011 issued in Japanese Application No. 2007-554739 with English translation, 5 pp.

Interrogation mailed Feb. 3, 2012 issued in Japanese Application No. 2007-554739 with English translation, 6 pages.

Non-Final Office Action mailed Sep. 19, 2012 in U.S. Appl. No. 11/923,681, 7 pages.

Office Action dated Jan. 16, 2013 issued in Chinese Application No. 200680004654.5, with English translation, 15 pages.

Final Office Action mailed Feb. 28, 2013 in U.S. Appl. No. 11/923,681, 9 pages.

Non-Final Office Action mailed Jun. 17, 2013 in U.S. Appl. No. 11/923,681, 10 pages.

Decision of Rejection dated Jun. 5, 2013 issued in Chinese Application No. 200680004654.5 with English translation, 18 pages.

Office Action dated Jun. 26, 2009 in Chinese Application No. 200680004654.5 with English translation, 17 pages.

English Translation of Office Action mailed Aug. 25, 2009 in Korean Application No. 10-2007-7020810, 3 pages.

Office Action mailed Feb. 18, 2010 in Korean Application No. 10-2007-7020810 with English translation, 6 pages.

English Translation of Trial Decision dated Aug. 22, 2011 in Korean Application No. 10-2007-7020810, 11 pages.

Office Action dated Sep. 6, 2011 in Chinese Application No. 200680004654.5 with English translation, 5 pages.

Final Office Action mailed Nov. 20, 2013 in U.S. Appl. No. 11/923,681, 30 pages.

Final Office Action mailed Mar. 24, 2014 in U.S. Appl. No. 11/923,681, 15 pages.

* cited by examiner

NAND FLASH MEMORY SYSTEM ARCHITECTURE

This patent application claims the benefit of U.S. Provisional Patent Application Ser. No. 60/651,762, filed Feb. 11, 2005. This patent application also claims the benefit of U.S. Provisional Patent Application Ser. No. 60/758,599, filed Jan. 13, 2006.

FIELD AND BACKGROUND OF THE INVENTION

The present invention relates to a NAND flash memory device and, more particularly, to a NAND flash memory device that is easy to integrate with a host processor and also allows the host processor to boot from the memory device.

Flash devices are electrically erasable and programmable read-only memories (EEPROMs) made of flash-type, floating-gate transistors and are non-volatile memories similar in functionality and performance to EPROM memories, with an additional functionality that allows an in-circuit, programmable operation to erase portions of the memory. Flash devices have the advantage of being relatively inexpensive and requiring relatively little power as compared to traditional magnetic storage disks. However, flash devices have certain limitations that make using them at the physical address level a bit of a problem. In a flash device, it is not practical to rewrite a previously written area of the memory without a prior erase of the area, i.e., flash cells must be erased (e.g. programmed to "one") before they can be programmed again. Erasing can only be done for relatively large groups of cells usually called "erase blocks" (typically of size 16 to 256 Kbytes in current commercial NAND devices, and of larger size in NOR devices). Therefore updating the contents of a single byte or even of a chunk of 1 kilobytes requires "housekeeping" operations—parts of the erase block that are not updated must first be moved elsewhere so they will be preserved during erasing, and then moved back into place.

Furthermore, some of the blocks of the device may be "bad blocks", which are not reliable and whose use should be avoided. Blocks are declared as "bad blocks" either by the manufacturer when initially testing the device, or by application software when detecting the failure of the blocks during use of the device in the field.

To overcome these limitations of the background art, a Flash File System (FFS) was implemented, as disclosed in U.S. Pat. No. 5,404,485 to Ban. This patent is assigned to the assignee of the present application and is incorporated by reference as if fully set forth herein. FFS provides a system of data storage and manipulation on flash devices that allows these devices to emulate magnetic disks. In the existing art, applications or operating systems interact with the flash storage subsystem not using physical addresses but rather virtual addresses. There is an intermediary layer between the software application and the physical device that provides a mapping (also referred to herein as a "translation") from the virtual addresses into the physical addresses. While the application or operating system software may view the storage system as having a contiguous defect-free medium that can be read or written randomly with no limitations, the physical addressing scheme has "holes" in its address range (due to bad blocks, for example), and pieces of data that are adjacent to each other in the virtual address range might be greatly separated in the physical address range. The intermediary layer that does the mapping described above may be a software driver running on the same CPU on which the applications run. Alternatively, the intermediary layer may be embedded within a controller that controls the flash device and serves as the interface point for the main CPU of the host computer when the host computer accesses the storage. This is for example the situation in removable memory cards such as SecureDigital (SD) cards or MultimediaMemoryCards (MMC), where the card has an on-board controller running a firmware program that among other functions, implements the type of mapping described above.

Software or firmware implementations that perform such address mappings are usually called "flash management systems" or "flash file systems". The term "flash file system" actually is a misnomer, as the implementations do not necessarily support "files", in the sense that files are used in operating systems or personal computers, but rather support block device interfaces similar to those exported by hard disk software drivers. Still, the term is commonly used, and "flash file system" and "flash management system" are used herein interchangeably.

Other prior art systems that implement virtual-to-physical address mapping are described in U.S. Pat. No. 5,937,425 to Ban and U.S. Pat. No. 6,591,330 to Lasser. Both of these patents are incorporated by reference for all purposes as if fully set forth herein.

In U.S. Pat. No. 5,937,425, which is particularly suitable for NAND-type flash devices, the mapping is done as follows, referring to FIG. 1 (prior art). A physical address space 13 is composed of units 111 that are actually the erase blocks i.e. the smallest chunks that can be erased. Each physical unit 111 contains one or more physical pages 113, where a page is the smallest chunk that can be written. A virtual address space 11 is composed of virtual units 121 that have the same size as the physical units. Each virtual unit contains one or more virtual pages 123, having the same size as physical pages 113. When a virtual address is provided by an application, for reading or writing, the virtual unit number to which that address belongs is extracted from the virtual address. There is a mapping that assigns to each virtual unit 121 either one physical unit 111 or a chain of several physical units 111. Then the physical page 113 corresponding to the requested virtual page 123 within virtual unit 121 is located within the corresponding physical unit(s) 111, using a "local" mapping rule that relates virtual pages 123 to physical pages 113, or using control information stored with physical pages 113.

Figure 1:
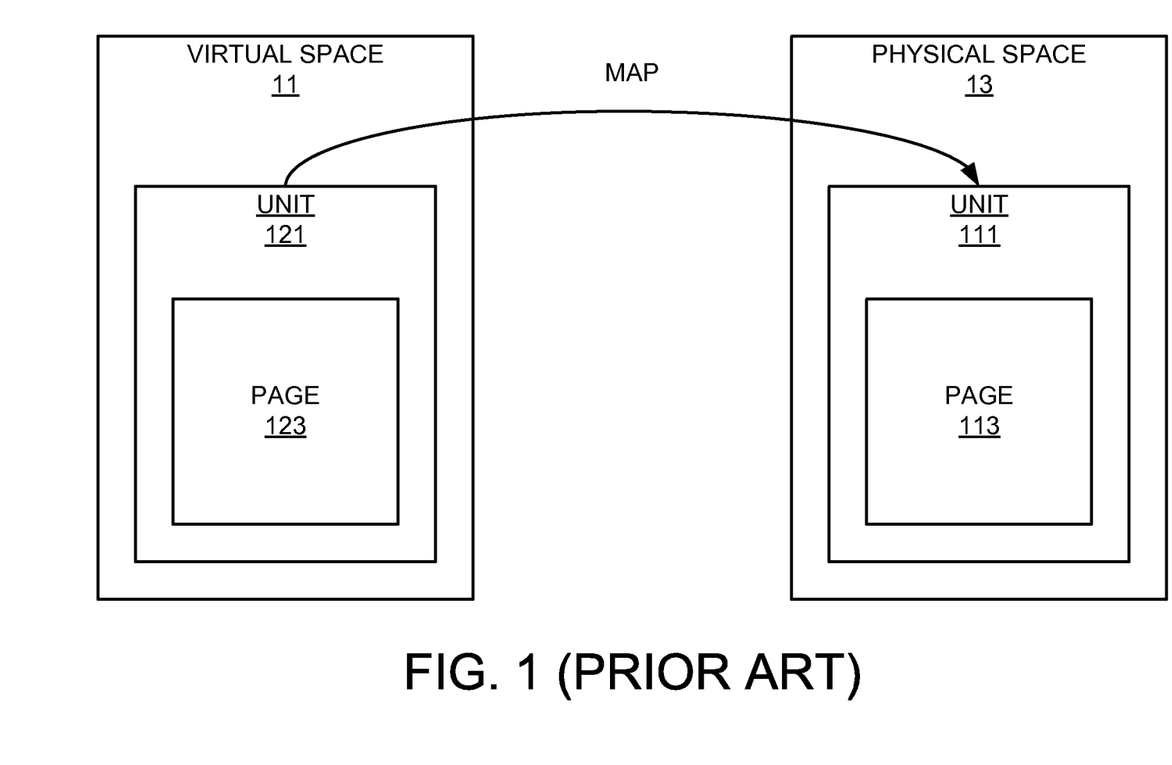
FIG. 1 illustrates virtual address to physical address mapping according to the prior art.

One of the advantages of the methods disclosed in U.S. Pat. No. 5,937,425 is that because the main mapping is done over units rather than pages, the translation tables become much smaller than they would be if virtual pages were mapped directly to physical pages, as there are much fewer units than pages. Another advantage is write performance improvement that results from being able to assign more than one physical unit 111 to one virtual unit 121.

Because NAND flash is less expensive than NOR flash, most flash-based data-intensive storage devices today use NAND flash. Because of the considerations discussed above, many of the NAND flash memory-based storage devices in common use today have an architecture in which a flash memory controller is located between a host processor running an operating system and software applications that use the storage device, on one side, and the flash memory media in which storage takes place on the other side. The controller includes the functionality of a flash management system, including the functionality of address mapping as described above. The controller may also include additional functionalities such as error correction, cryptography and more, but these additional functionalities are not germane to the present invention.

The most well known NAND flash memory storage devices employing such architecture are memory cards used in digital cameras and cellular phones, such as the SD or MMC cards. But there are also many other devices employing this architecture—USB Flash Drives (UFDs), CompactFlash (CF) cards and others.

The advantage of such a memory architecture, in which flash management and more specifically address mapping is done within a separate controller and hidden from the host processor running the software applications, is the simplicity of integrating the host processor to the storage device. From the host point view, the host 5 is presented with an ideal storage device with no bad blocks and with random access to each storage sector. The only thing to do to integrate the storage device with the host is to implement the interface protocol required by the controller—USB, SD and the like. Most operating systems provide off-the-shelf drivers for those interface protocols, and therefore the integration effort is minimal.

There is, however, one disadvantage common to all current solutions employing this architecture: the host processor cannot boot from the storage device. By the term "boot" is meant herein the ability of a host processor immediately after power-on to start code execution with code stored in the storage device. In other words, a storage device is bootable if the very first commands the host processor executes after its gets out of its "reset" mode after applying power, are retrieved from that storage device. It is true there are systems in which a host processor loads its operating system code from a USB-based or SD-based storage device (see for example U.S. Application Ser. No. 11/102,814), but in all such cases the host processor does not boot from the storage device in the sense of the above definition of "boot". In all those cases the very first commands executed by the processor after power-up are retrieved from a separate source—another flash device (such as BIOS in PCs), an internal ROM, or some other source. Only after executing the boot code from the other source, does the host processor access the flash storage device containing the flash management system and retrieves from it additional code that to be executed. Typically that additional code is code of an operating system, and then it is common to speak about "booting the operating system from the storage device" or even "booting the host processor from the storage device", but that is not how the term "boot" is understood herein. For the purpose of the current invention the term "boot" should always be understood to have the restrictive and limited meaning explained above of the execution of the very first commands after powering up the host processor.

This disadvantage of not providing boot capability is actually the result of another characteristic of the prior art implementations of the above architecture—the interfaces (or "buses") exported by the controllers to the host are not executable. An "executable interface" or an "executable bus" is an interface in which computer machine code can be retrieved and directly executed by the processor without first being copied to some other memory device outside the processor and then retrieved again for execution. For example, the parallel interface with which a PC accesses its SRAM or BIOS device is an executable interface, but USB and SD interfaces are not executable interfaces.

Interfaces that are not executable cannot provide boot capability. This is not a coincidence but is inherent in the concept of executable interface—if the interface could provide boot capability it would by definition be executable.

Figure 2:
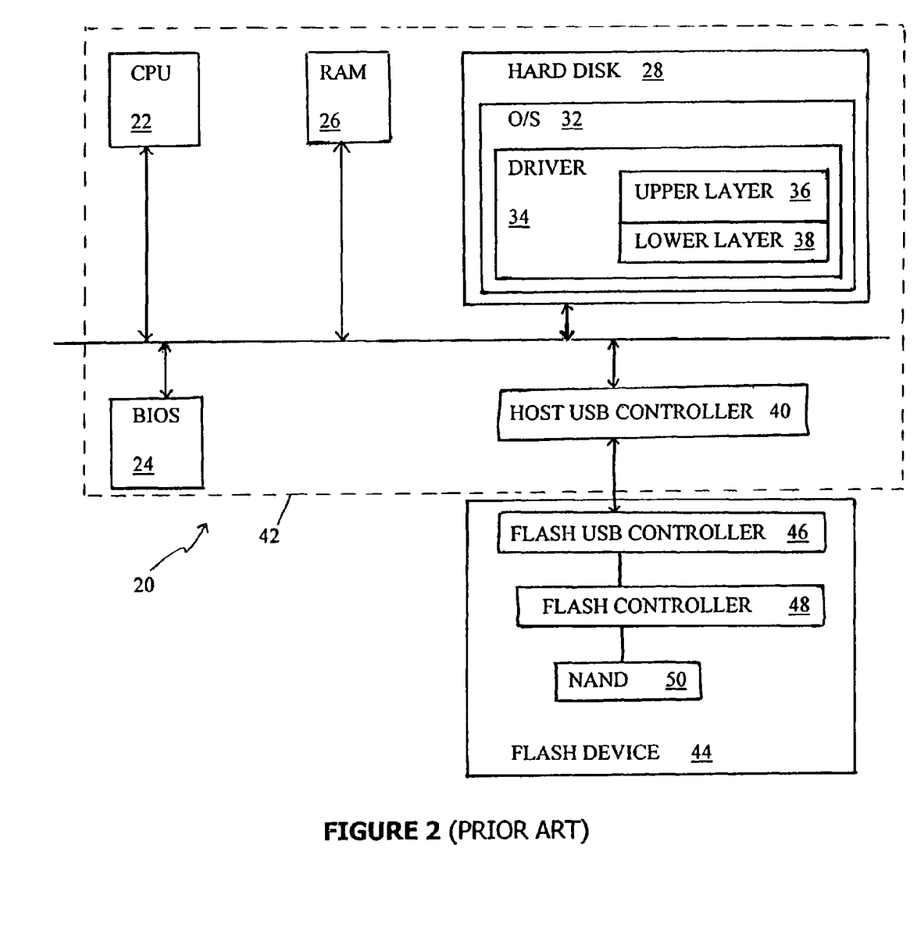
FIG. 2 is a partial high-level block diagram of a prior art computational system.

FIG. 2 is a partial high-level schematic block diagram of an exemplary prior art computational system 20 that includes a flash memory device 44 with the architecture discussed above. Specifically, system 20 is a personal computer (PC). PC 20 also includes a processor 22, a BIOS 24, a RAM 26 and a hard disk 28, all communicating with each other via a bus 30. Hard disk 28 serves as the main non-volatile memory of PC 20. The operating system 32 of PC 20 is stored in hard disk 28. On power-up, processor 22 boots from BIOS 24 and then copies operating system 32 from hard disk 28 to RAM 26 and executes operating system 28 from RAM 26.

Operating system 32 includes a driver 34 for flash memory device 44. Driver 34 has two layers of software: an upper layer 36 and a lower layer 38. Lower layer 38 manages the communication per se with flash memory device 44 via a host-side USB controller 40. Upper layer 36 translates between the data stream handled by the lower layer and memory access commands (read sector, write sector) and responses by flash memory device 44 to those commands that are intelligible to applications running on PC 20.

Flash memory device 44 includes a device-side USB controller 46 for communicating with the rest of PC 20 via host-side USB controller 40 according to the USB protocol, a NAND flash memory 50 and a flash controller 48. Flash controller 48 implements a flash management system for NAND flash memory 50 as described above. Relative to flash memory device 44, the rest of PC 20 is a host of flash memory device 44.

As a result of the above we conclude that all prior art NAND flash storage devices employing the architecture of controller-implemented flash management have neither executable interfaces nor boot capability. This is a major disadvantage, as any system using those storage devices must also include some other storage element for supporting the initial boot stage of the system.

There are some prior art NAND flash storage devices that employ a different architecture that does provide boot capability. In those systems, even though there is a controller between the host processor and the NAND flash device, the flash management functionality (including the address mapping) is implemented in the host processor and not in the controller. The controller provides other functionalities such as error correction that are not relevant to the present invention, and also provides the boot capability. The controller implements and exports an executable interface such as an SRAM interface. The controller also includes a small section of SRAM memory accessible by the host through the SRAM interface. On power-up of the system the controller, automatically and independently of the host processor, copies the initial boot code from the NAND storage cells to the section of SRAM. When the host starts code execution after exiting its "reset" power-up state, the very first code to be executed is the code in the SRAM section. Examples of devices employing this second architecture are the DiskOnChip™ products of M-Systems Flash Disk Pioneers Ltd. of Kfar-Saba, Israel, and the OneNAND™ products from Samsung Electronics of Seoul, South Korea. Both companies offer or have offered both products in which the controller is on a separate die from the NAND flash memory die and products in which the controller and the flash memory are integrated onto a common die. Both variations are considered to have the same second architecture for the purpose of the present invention, and the present invention is equally applicable to both cases: the controller and the NAND flash memory can be either on separate dies or on the same die. It should also be noted that in this application the term "storage device" should always be understood as referring to the combination of a controller (in case it exists) and the device that actually stores the data, regardless of whether or not the controller is physically separate from the storage element.

Devices that employ the above second architecture solve the problem of boot support. However, as these devices use flash memory management that executes on the host processor, their integration with the host processor is more complex. Typically, such integration requires the provision by the storage device vendor of a software driver that is compilable for the type of processor used, and also some tailoring of that software driver code according to the specific details of the implementation of the system.

The prior art does not teach any storage device that combines the advantages of the above two architectures. This is not surprising—the main goal of the designers of all the solutions employing the first architecture was to achieve a very-easy-to-integrate interface. This is why they chose to hide the flash management activities inside the controller. Selecting an executable interface as the interface between the host and the storage device would have defeated the purpose of those designs. Executable interfaces increase the level of interaction between the processor and the storage device, and therefore result in more complex integration between them. This is the reason why no prior art storage device provides both boot support and controller-based flash management.

There is thus a widely recognized need for, and it would be highly advantageous to have, a data storage device that provides both boot support and controller-based memory management.

SUMMARY OF THE INVENTION

According to the present invention there is provided a data storage device including: (a) a NAND flash memory; (b) an executable interface; and (c) a controller for receiving from a host, via the executable interface, an instruction to access the NAND flash memory at a virtual address, and for translating the virtual address to a physical address in the NAND flash memory.

According to the present invention there is provided a method of operating a system, including the steps of: (a) including, in the system, a data storage device that includes a NAND flash memory in which is stored boot code; (b) on power up, executing the boot code; (c) subsequently, issuing to the data storage device an instruction to access the memory at a virtual address; and (d) translating the virtual address to a physical address of the memory, by the data storage device.

According to the present invention there is provided a method by which a data storage device that includes a memory interacts with a host of the data storage device, including the steps of: (a) presenting an executable interface to the host; (b) receiving, from the host, an instruction to access the memory at a virtual address; and (c) translating the virtual address to a physical address of the memory.

A basic data storage device of the present invention includes a NAND flash memory, an executable interface and a controller. The controller is for receiving, from a host of the data storage device via the executable interface, an instruction to access the NAND flash memory at a virtual address and for translating the virtual address to a physical address in the NAND flash memory. "Accessing" the NAND flash memory includes at least reading data from the NAND flash memory and writing data to the NAND flash memory.

Preferably, the controller also is operative to provide boot functionality to the host. One preferred way in which the controller provides such boot functionality is by including within itself a volatile memory and by copying boot code from the NAND flash memory to the volatile memory when the host is powered up. Most preferably, the volatile memory is a SRAM and the executable interface is a SRAM interface.

Preferably the NAND flash memory has code stored therein for a driver that the host executes to send the instruction to the controller via the executable interface.

According to one method of the present invention, to operate a computational system, a data storage device that includes a NAND flash memory is included in the system. Boot code is stored in that memory. On power up, the boot code is executed. Subsequently, an instruction is issued to the data storage device to access the memory at a virtual address, and the data storage device translates the virtual address to a physical address of the memory.

According to another method of the present invention, a data storage device s that includes a memory interacts with a host of the data storage device by presenting an executable interface to the host, receiving from the host an instruction to access the memory at a virtual address, and translating the virtual address to a physical address of the memory.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a data storage device that performs its own virtual to physical address translation and also presents an executable interface to a host. Specifically, the present invention can be used by its host as both a boot memory and a main non-volatile memory.

The principles and operation of a data storage device according to the present invention may be better understood with reference to the drawings and the accompanying description.

The present invention provides both boot support and internal flash management by adopting an architecture that is different from both of the previously described prior art architectures, and is a kind of a hybrid architecture between the two prior art architectures.

A storage device of the present invention includes a controller that interfaces with the device's storage media on one side and with the host processor on the other side. As in the first prior art architecture, the controller includes the functionality of flash management, including the functionality of address mapping. But unlike the devices of the first architecture, the interface exported by the controller to the host processor is an executable interface, such as an SRAM interface. As in the second architecture, the controller also includes a small section of SRAM memory accessible by the host through the SRAM interface. On power-up of the system the controller, automatically and independently of the host processor, copies the initial boot code from the NAND storage cells to the section of SRAM. When the host starts code execution after exiting its "reset" power-up state, the very first code to execute is the code in the SRAM section.

Figure 3:
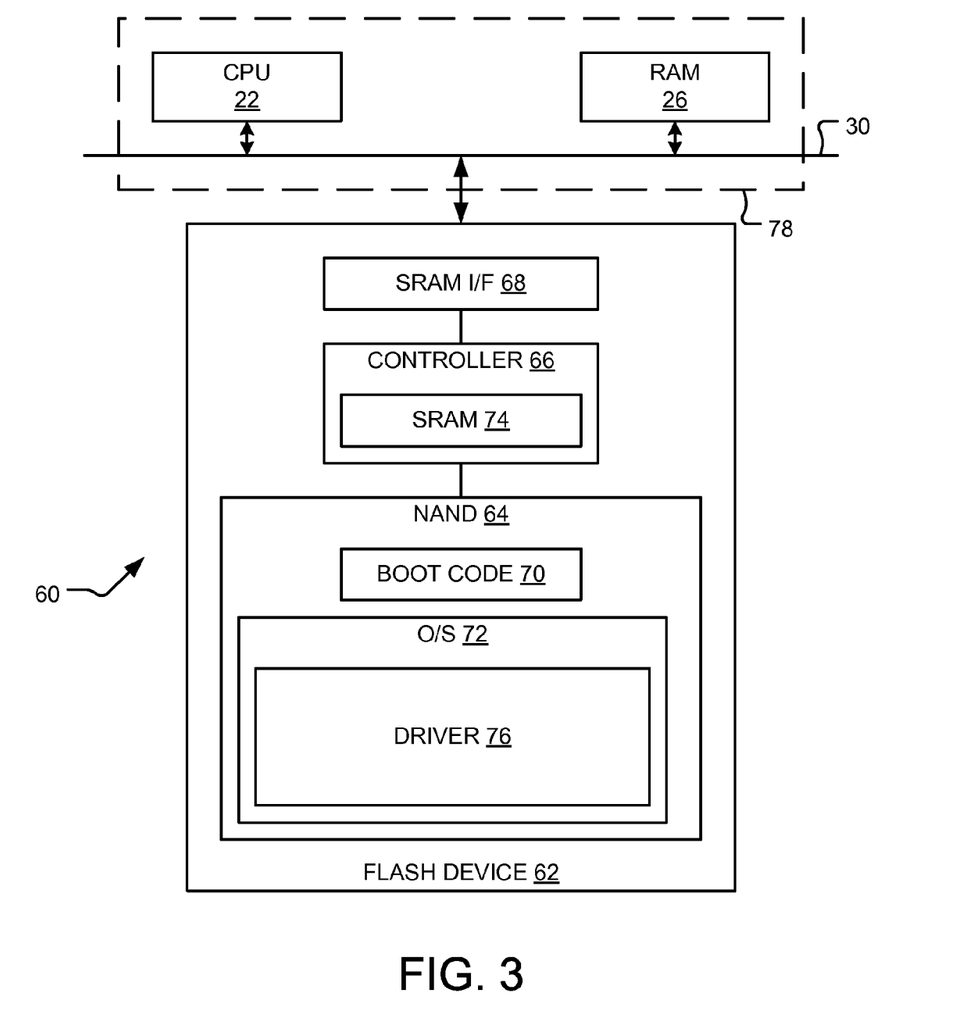
FIGS. 3 and 4 are partial high-level block diagrams of computational systems of the present invention.

Referring again to the drawings, FIG. 3 is a partial high-level schematic block diagram of a computational system 60 of the present invention. Examples of computational systems for which the illustrated architecture is suitable include computers such as personal computers, computer-based appliances and portable appliances such as cellular telephones.

The components that are common to both system 60 and prior art system 20 (processor 22, RAM 26 and bus 30) have identical reference numerals. The principal difference between system 60 and system 20 is that in system 60 the three nonvolatile memory devices of system 20 (BIOS 24, hard disk 28 and flash memory device 44) are replaced by a single flash memory device 62.

Flash memory device 62 includes a NAND flash memory 64, a flash controller 66 and an executable interface, specifically, a SRAM interface 68. In NAND flash memory are stored boot code 70 and the operating system 72 of system 60. Operating system 72 includes a driver 76 for flash memory device 62. Like flash controller 48, flash controller 66 implements a flash management system for NAND flash memory 64. Flash controller 66 also includes a SRAM 74 to which flash controller 66 copies boot code 70 on power-up. That SRAM interface 68 is executable enables system 60 to boot from flash memory device 62, just like a system with a flash memory device of the second prior art architecture. Relative to flash memory device 62, the rest of system 60 is a host 78 of flash memory device 62.

When system 60 powers up, flash controller 66 copies boot code 70 to SRAM 74. Processor 22 boots from SRAM 74 via SRAM interface 68 and then copies operating system 72 to RAM 26. Subsequent access of flash memory device 62 by operating system 72 and by applications running on system 60 is via driver 76. Note that in order for processor 22 to be able to copy operating system 72 to RAM 26, after executing boot code 70, boot code 70 must include instructions for copying driver 76 to RAM 26. The subsequent copying of operating system 72 to RAM 26 then is only of the remainder of operating system 72.

One drawback of system 60 is that driver 76 must be written ab initio to support communication with flash controller 66 through SRAM interface 68. In order to overcome the more complex integration associated with an executable interface, the present invention preferably emulates a standard interface protocol such as a USB interface or an SD interface on top of the executable physical interface between the host and the storage device. Such emulation allows the software applications or operating system running on the host to easily access the storage device, using standard drivers that are available in the operating system for accessing devices that physically have those standard interfaces. All integration efforts are thus localized to the emulation software, and the emulation software has to be tailored and integrated only once for any combination of a storage device type and a host processor type.

Figure 4:
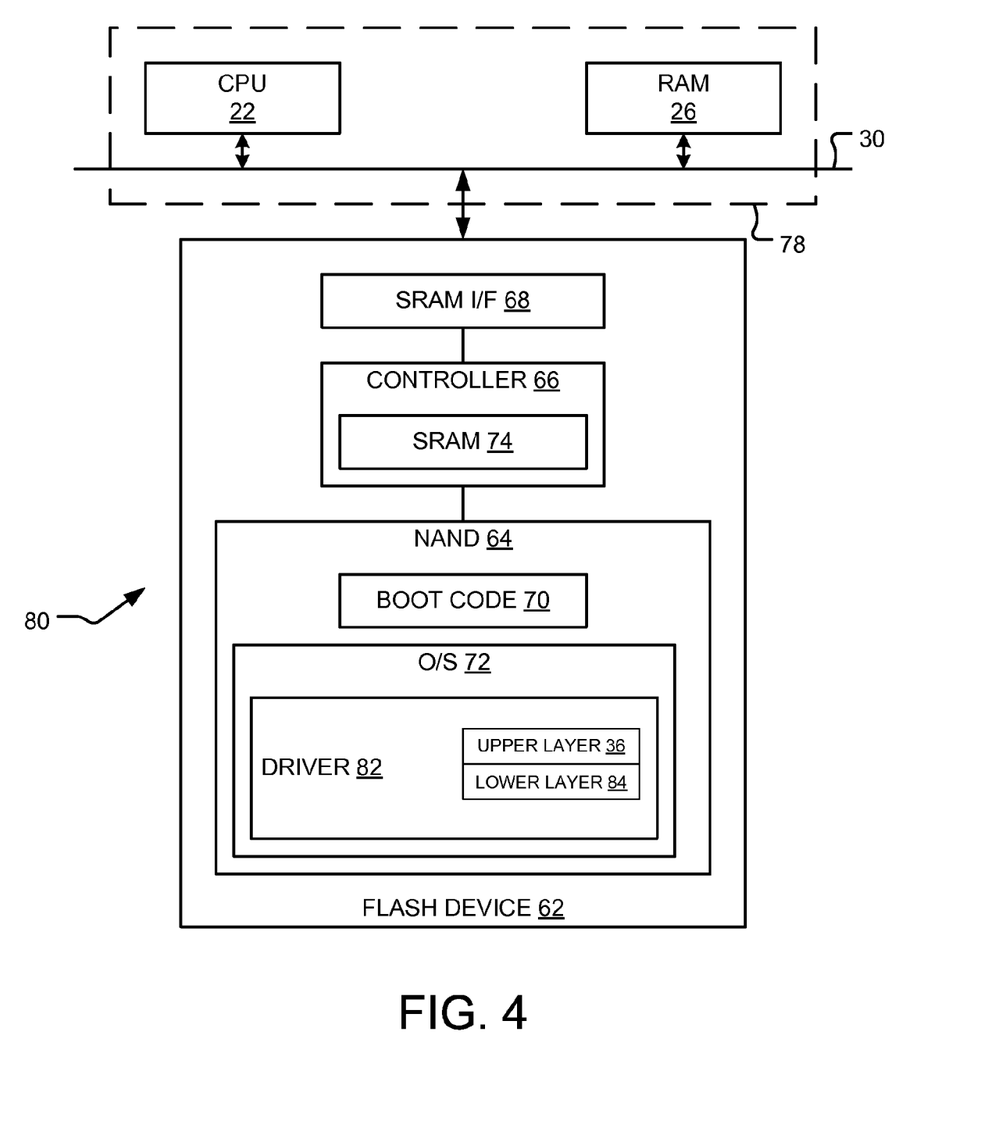

FIG. 4 illustrates one way in which this emulation is done. FIG. 4 is a partial high-level schematic block diagram of another computational system 80 of the present invention. System 80 is a modified version of system 60: components that are common to systems 20, 60 and/or 80 have identical reference numerals. The difference between systems 60 and 80 is that the driver 82 that system 80 uses for accessing flash memory device 62 is written by modifying prior art driver 34 of system 20. Driver 82 retains upper layer 36 but has a new lower layer 84 of the present invention for managing the communication between upper layer 36 and SRAM interface 68.

While the invention has been described with respect to a limited number of embodiments, it will be appreciated that many variations, modifications and other applications of the invention may be made.

What is claimed is:

1. A data storage device comprising:
   a NAND flash memory storing an operating system including multiple drivers, wherein the multiple drivers include a first driver; and
   an executable interface configured to be coupled to a host device;
   wherein the multiple drivers are retrievable by a host processor of the host device,
   wherein the first driver, after being copied to the host device, enables the host processor of the host device to emulate a universal serial bus (USB) interface protocol on top of the executable interface, and
   wherein the emulated USB interface protocol enables an application or the operating system executed by the host processor to access the NAND flash memory.

2. The data storage device of claim 1, further comprising a controller including a volatile memory, wherein the NAND flash memory stores boot code, wherein the controller is further configured to copy the boot code from the NAND flash memory to the volatile memory when the host processor is powered up, and wherein the executable interface enables the host processor to retrieve the boot code from the volatile memory.

3. The data storage device of claim 2, wherein the volatile memory is a static random access memory (SRAM), and wherein the boot code includes one or more instructions that are executable by the host processor to copy the first driver included in the operating system from the NAND flash memory to the host device.

4. The data storage device of claim 3, wherein the controller is configured to translate a virtual address that is received from the host processor via the executable interface to a physical address of the NAND flash memory, and wherein the translation is completed within the controller.

5. The data storage device of claim 4, wherein, after the first driver is copied to the host device, the controller is further configured to copy a remainder of the operating system stored in the NAND flash memory to the host device.

6. The data storage device of claim 1, wherein the emulated USB interface protocol enables the application or the operating system to access the data storage device using a standard driver available in the operating system.

7. The data storage device of claim 6, wherein the standard driver is a USB driver.

8. The data storage device of claim 6, wherein the standard driver is included in the multiple drivers.

9. The data storage device of claim 1, wherein the first driver includes an upper layer and a lower layer.

10. The data storage device of claim 9, wherein the lower layer is configured to manage communication between the upper layer and the executable interface.

11. The data storage device of claim 9, wherein the upper layer is configured to translate between the lower layer and one or more commands associated with the application or the operating system.

12. The data storage device of claim 11, the emulated USB interface protocol enables the application or the operating system to access the data storage device using a standard driver available in the operating system.

13. The data storage device of claim 12, wherein the one or more commands are associated with the standard driver.

14. A method of operating a data storage device, the method comprising:
   in a data storage device with a NAND flash memory and a controller, performing:

providing an operating system stored in the NAND flash memory from the data storage device to a host device, wherein the operating system includes multiple drivers including a first driver, wherein the first driver, after being copied to the host device, enables a host processor of the host device to emulate a universal serial bus (USB) interface protocol on top of an executable interface of the data storage device, and wherein the emulated USB interface protocol enables an application or the operating system executed by the host processor to access the NAND flash memory; and communicating with the host device via the emulated USB interface protocol.

15. The method of claim 14, wherein the data storage device is configured to translate a virtual address associated with an instruction to a physical address of the NAND flash memory and to access the NAND flash memory at the physical address obtained from translating the virtual address, and further comprising:

on power-up of the host processor of the host device, providing boot code from a volatile memory within the controller of the data storage device to the host processor via the executable interface, wherein the boot code includes one or more instructions executable by the host processor to copy the first driver from the NAND flash memory to the host device;

copying the first driver from the NAND flash memory to the host device; and copying a remainder of the operating system from the NAND flash memory to the host device, wherein, after copying the remainder of the operating system to the host device, the host device includes the multiple drivers.

16. A method comprising:

in a NAND data storage device that includes NAND flash memory, a controller that includes static random access memory (SRAM), and an SRAM interface to interface with a host device, performing:

copying boot code from the NAND flash memory to the SRAM, wherein the boot code includes instructions for copying a driver of the NAND flash memory from the NAND flash memory to the host device, wherein the NAND flash memory stores an operating system that includes multiple providing the boot code from the SRAM to a host processor of the host device via the SRAM interface, and providing the driver to the host device via the SRAM interface, and wherein the driver, after being copied to the host device, enables the host processor to emulate a universal serial bus (USB) interface protocol on top of the SRAM interface, and wherein the emulated USB interface protocol enables an application or the operating system executed by the host processor to access the NAND flash memory.

17. The method of claim 16, wherein the NAND data storage device is configured to translate a virtual address received from the host processor via the SRAM interface to a physical address of the NAND flash memory and to access the NAND flash memory at the physical address obtained from translating the virtual address.

18. A system comprising:

a host processor within a host device; and a data storage device, the data storage device including:

an executable interface configured to be coupled to the host device; and a flash memory storing an operating system including multiple drivers, wherein the multiple drivers include a first driver, wherein the multiple drivers are stored in the flash memory and are retrievable by the host processor, wherein the first driver, after being copied to the host device, enables the host processor to emulate a universal serial bus (USB) interface protocol on top of the executable interface, and wherein the emulated USB interface protocol enables an application or the operating system executed by the host processor to access the flash memory.

19. The system of claim 18, wherein the data storage device further includes a controller configured to translate a virtual address associated with an instruction to a physical address of the flash memory, wherein the translation is completed within the data storage device, and wherein the instruction is received by the controller via the executable interface.

* * * * *

UNITED STATES PATENT AND TRADEMARK OFFICE
CERTIFICATE OF CORRECTION

| | | |
|---|---|---|
| PATENT NO. | : 8,990,475 B2 | Page 1 of 1 |
| APPLICATION NO. | : 11/350946 | |
| DATED | : March 24, 2015 | |
| INVENTOR(S) | : Avraham Meir et al. | |

It is certified that error appears in the above-identified patent and that said Letters Patent is hereby corrected as shown below:

In the Claims,

Column 10, Claim 16, Line 3, "that includes multiple" should be --that includes multiple drivers, and wherein the multiple drivers include the driver;--.

Signed and Sealed this
Twenty-second Day of March, 2016

Michelle K. Lee
*Director of the United States Patent and Trademark Office*